Nov. 13, 1945.   L. B. REDMOND   2,389,081
GALVANOMETER
Filed Sept. 14, 1943   5 Sheets-Sheet 1

INVENTOR.
Lury B. Redmond.
BY Sidney A. Johnson
Attorney.

INVENTOR.
Lury B. Redmond.
BY
Sidney A. Johnson
Attorney.

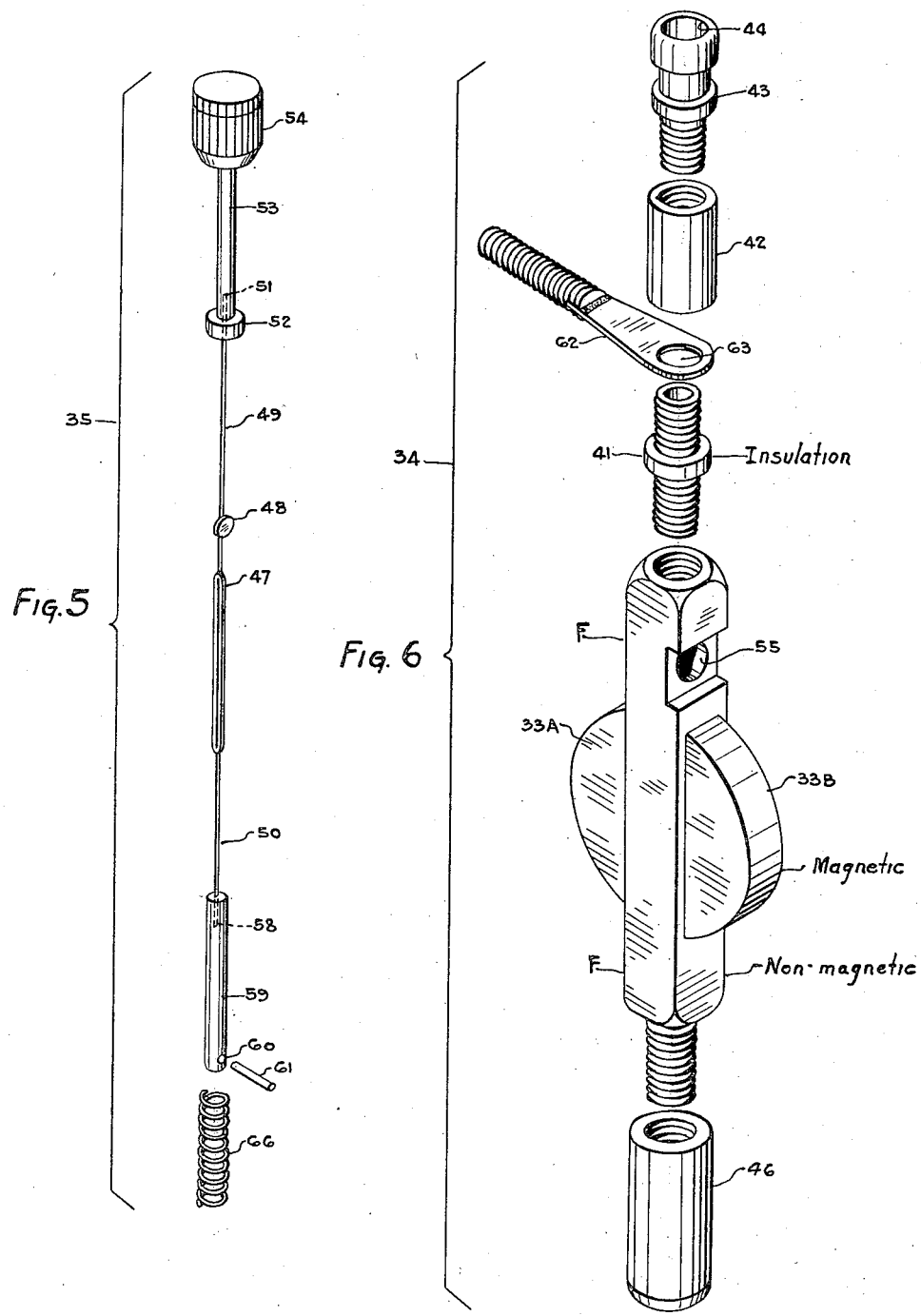

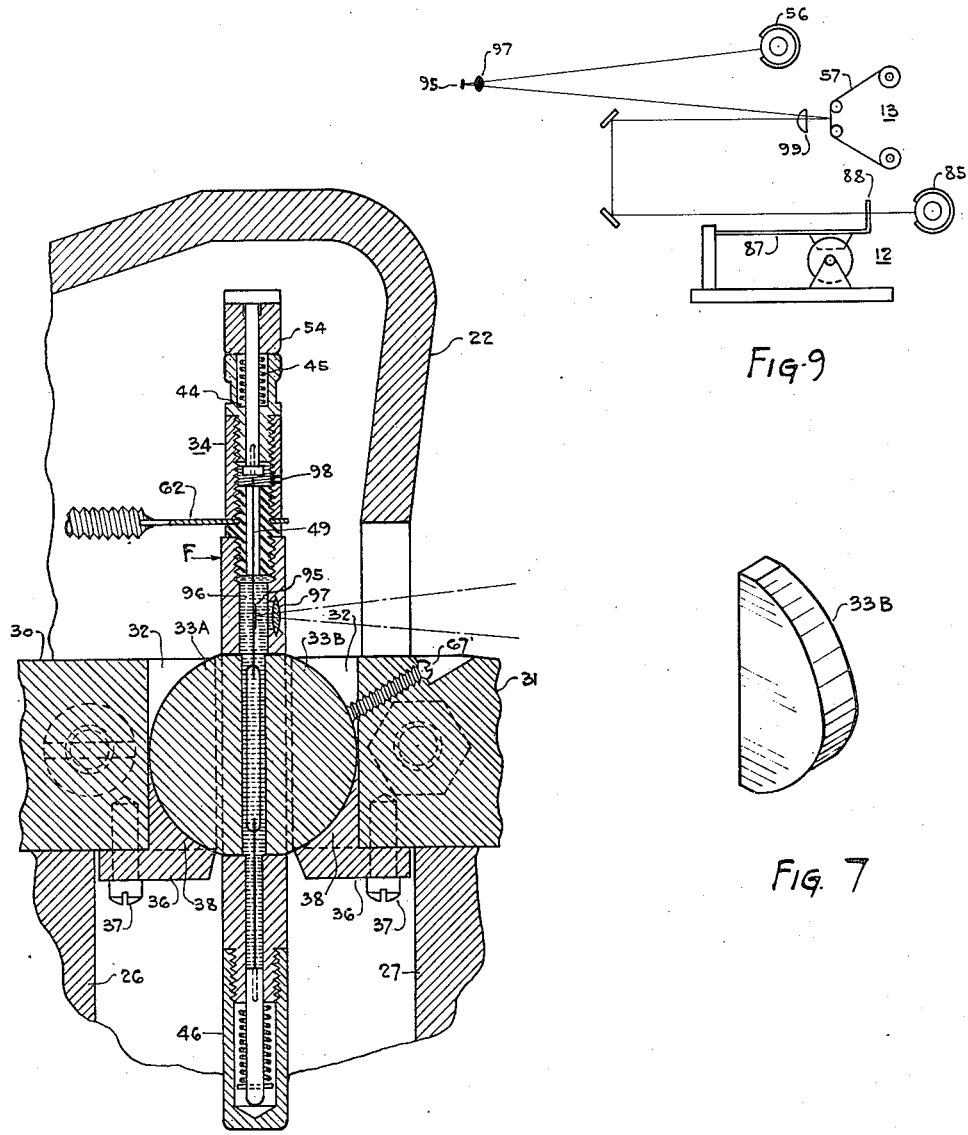

Patented Nov. 13, 1945

2,389,081

UNITED STATES PATENT OFFICE 2,389,081

GALVANOMETER

Lury B. Redmond, Fort Leavenworth, Kans., assignor, by mesne assignments, to Socony-Vacuum Oil Company, Incorporated, New York, N. Y., a corporation of New York Application September 14, 1943, Serial No. 502,360

25 Claims. (Cl. 171—95)

This invention relates generally to oscillographic apparatus and more particularly to that class of instruments known as recording galvanometers. While useful in other applications, recording galvanometers embodying the invention are especially desirable as elements of electric seismograph equipment of the type used for the conduct of geophysical surveys.

This application is a continuation-in-part of my copending application Serial No. 394,767 filed May 23, 1941, and entitled "Galvanometer,"

Multiple element galvanometers, due to the extreme sensitivity required in such instruments, have necessarily been very bulky in construction. Hence the problem confronting design engineers has been to design a galvanometer which will have the desired sensitivity and yet be of sturdy construction.

To obtain the very high degree of sensitivity required in instruments of this character it is necessary to use very fragile vibrating elements which when subjected to normal field work will break occasionally necessitating considerable delay in replacing the broken elements. In many of the instruments of the prior art, it has been necessary to abandon the use of that trace or to stop field operations and return the instrument to the laboratory where the ruptured element could be replaced. With galvanometers of this character the work of replacing the element and properly adjusting the tension on it is so tedious that it could not be accomplished in the field with such facilities as the instrument operator has at hand.

The manufacture of a small compact, sturdy instrument having the required sensitivity has not been limited alone by the delicacy of the vibrating elements but also by the flux densities required. Heretofore, the materials used in these instruments would not furnish flux densities in excess of 5,000 gausses, but in accordance with the present invention, the component parts and the materials of which they are made are so coordinated as to produce flux densities in the apparatus in the neighborhood of 9,000 gausses. In accordance with my invention, there is made available a multiple element recording galvanometer having 16 vibrating elements disposed side by side in a space of 4 inches, with flux densities in the region of 9,000 gausses at the pole faces of each element and across each galvanometer coil.

Therefore, the primary object of this invention resides in the provision of a small, compact, sturdy multiple element recording galvanometer having high sensitivity.

Another object of this invention resides in the provision of a multiple element galvanometer having vibrating elements which are completely enclosed in individual housings and which are assembled and adjusted before they are placed in operative position in the instrument.

Still another object of this invention resides in the provision of a multiple element galvanometer having vibrating elements enclosed in individual housings which may be replaced at the will of the operator, each as an independent unit without in any way affecting the adjustment of the other elements.

This invention further contemplates a multiple element galvanometer having magnetic pole face densities in the region of 9,000 gausses.

Still another object of this invention resides in the provision of a plurality of vibrating elements and their individual housings whose longitudinal axes can be adjusted from without the instrument casing without dismantling the instrument.

Another object of this invention resides in the provision of a multiple element recording galvanometer having individual vibrating elements completely enclosed in their respective housings, the housings for which are so designed that they form a portion of the magnetic flux circuit.

Another object of the invention is the provision of bearing means, the respective elements thereof comprising complementary cylindrical shaped elements of the flux path for rotatably mounting each individual housing and the galvanometer element contained therein.

Still another object of this invention resides in the provision of a multiple element recording galvanometer having independent vibrating elements enclosed in their respective housings which are so designed that at least four of the elements can be disposed in operative relationship in one inch of the width of the permanent magnet supplying the magnetic flux therefor.

Another object of this invention resides in the provision of a multiple element galvanometer having vibrating elements inclosed in individual housings and provided with fluid damping means.

Other objects and advantages of this invention will become apparent from the detailed description when taken with the drawings in which:

Fig. 3A is a fractional, sectional elevation on an enlarged scale taken on the line 3A—3A of Fig. 2.

Fig. 5 is a detail view of the vibrating element shown in perspective;

Fig. 6 is a dissociated view of the vibrating element housing shown in perspective;

Fig. 7 is a perspective view of one of the inner magnetic pole pieces before its assembly as a component part of the non-magnetic housing;

Fig. 8 is a fragmentary vertical sectional view of the instrument disclosing a modification of the instant invention in which the vibrating element is critically damped by a fluid such as oil; and Fig. 9 is a diagrammatic illustration of the optical system employed in the embodiment disclosed in Fig. 8.

Figure 1:
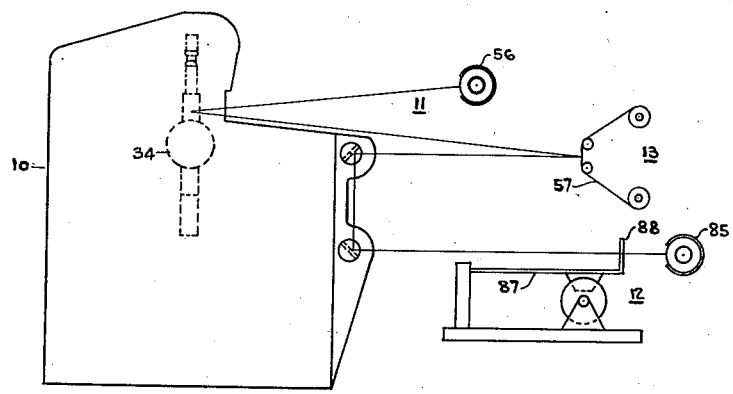
Fig. 1 is a diagrammatic illustration of a side elevation of a multiple element galvanometer showing its associated optical system and timing device.

Seismic waves are detected in the art of geophysical surveying by generating electrical signals corresponding to them. These electrical signals after amplification are recorded on a standard width of recorder strip which may be a photographic film or sensitized paper, in coordination with time. In Fig. 1 there is illustrated schematically the apparatus by means of which the signals are recorded after amplification. There is illustrated in this figure, a multiple element galvanometer 10, its associated optical system 11, a timing device 12 and the recorder 13.

Figure 3:
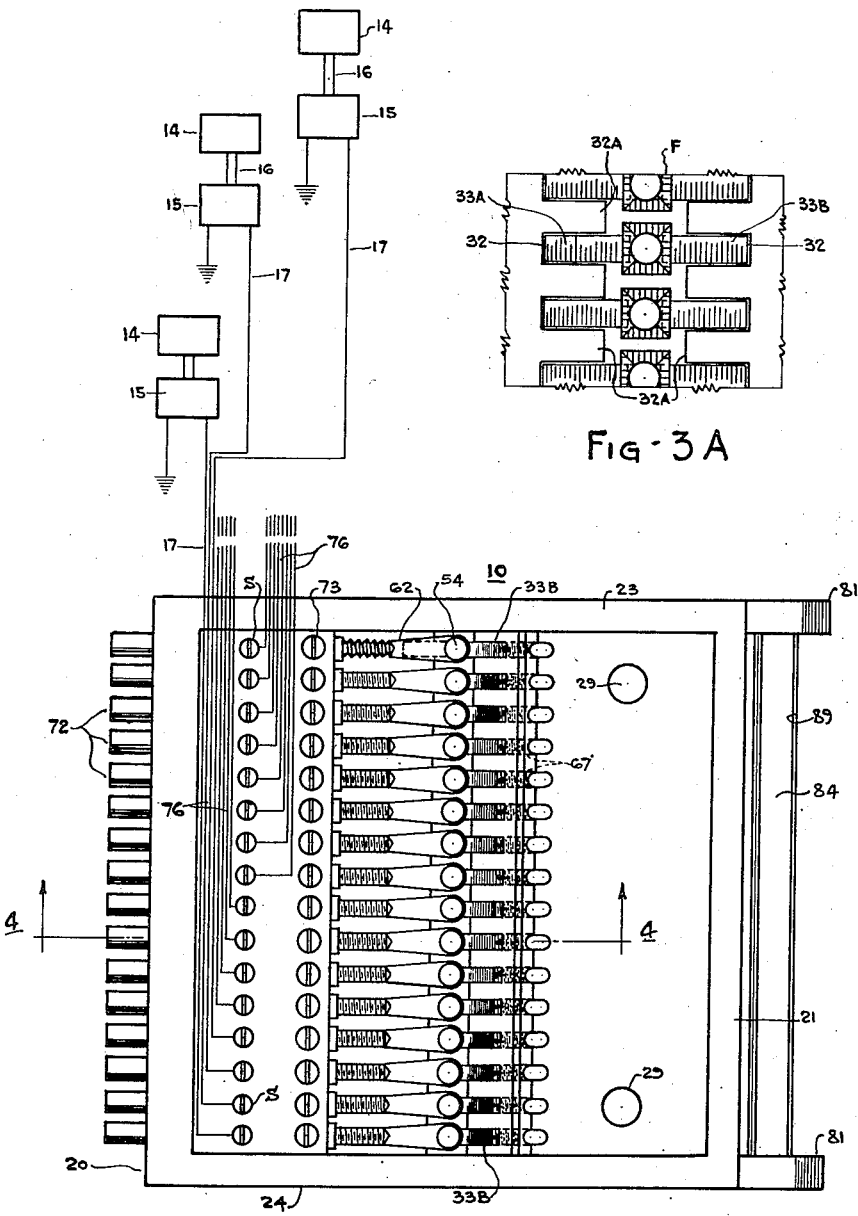
Fig. 3 is a plan view showing the instrument with its top plate removed exposing the individual casings for the vibrating elements in operative positions.

As shown in Fig. 3, signals generated by the detectors 14, which signals correspond with the seismic waves, are conducted to the amplifiers 15 by means of the conductors 16, where they are amplified. The amplified signals are then conducted by means of conductors 17 to the vibrating elements of the multiple element galvanometer 10.

Figure 2:
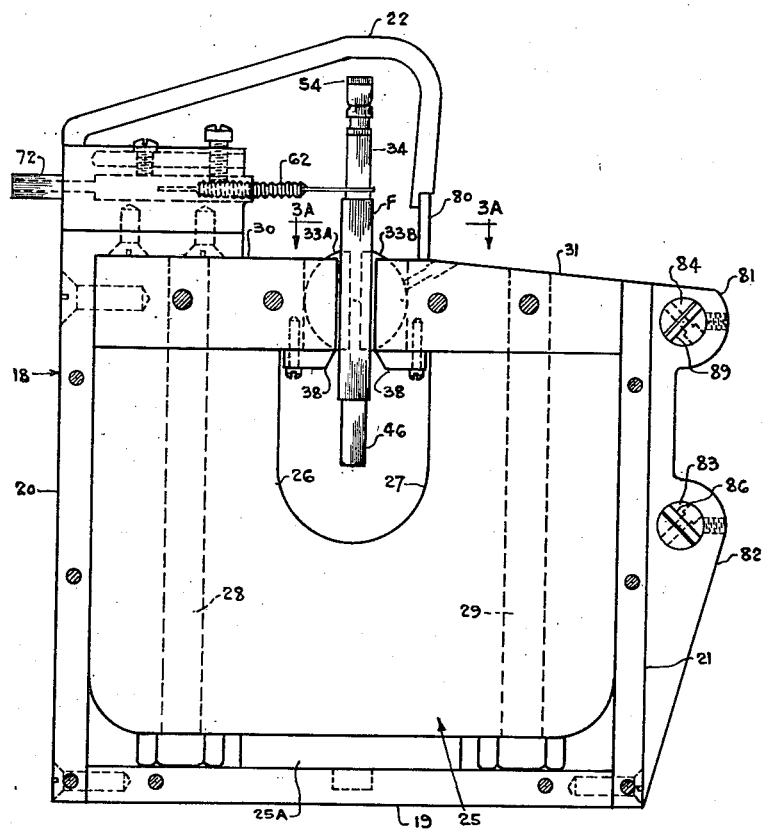
Fig. 2 is a side elevation of the instrument taken with the side plate removed.

The elements of the multiple element galvanometer 10 are enclosed within a case 18, Fig. 2, formed by the bottom 19, sides 20 and 21, top plate 22 and, Fig. 3, end walls 23 and 24. A permanent magnet 25, Fig. 2, of substantially U-shape, is positioned within the bottom of the housing 18 in such a manner that the arms 26 and 27 point upwardly. It may rest on a supporting insert 25A. The permanent magnet 25 is preferably formed of an alloy such as is known on the market under the trade name of "Alnico," or some other metal which will give flux densities ranging in the neighborhood of 9,000 gausses. For example, "Alnico" may comprise a hardened alloy of about 6% to 15% aluminum, 20% to 30% nickel, 5% to 7% cobalt, with the remainder iron. Secured to the pole faces of arms 26 and 27 of the permanent magnet 25 by means of bolts or set screws 28 and 29, are pole tips or pieces 30 and 31 respectively. These pole pieces are of substantial thickness and are substantially rectangular in cross section. Pole pieces 30 and 31 are also formed of magnetic material such as soft iron or a metal known by the trade name "Armco" and are so positioned relative to the permanent magnet that their outer edges are respectively flush with the outer edges of the arms 26 and 27 of the permanent magnet 25. The inner edges of the pole pieces 30 and 31 extend inwardly toward each other past the inner edges of arms 26 and 27 of the permanent magnet 25, to reduce the air gap between the two pole pieces.

Figure 4:
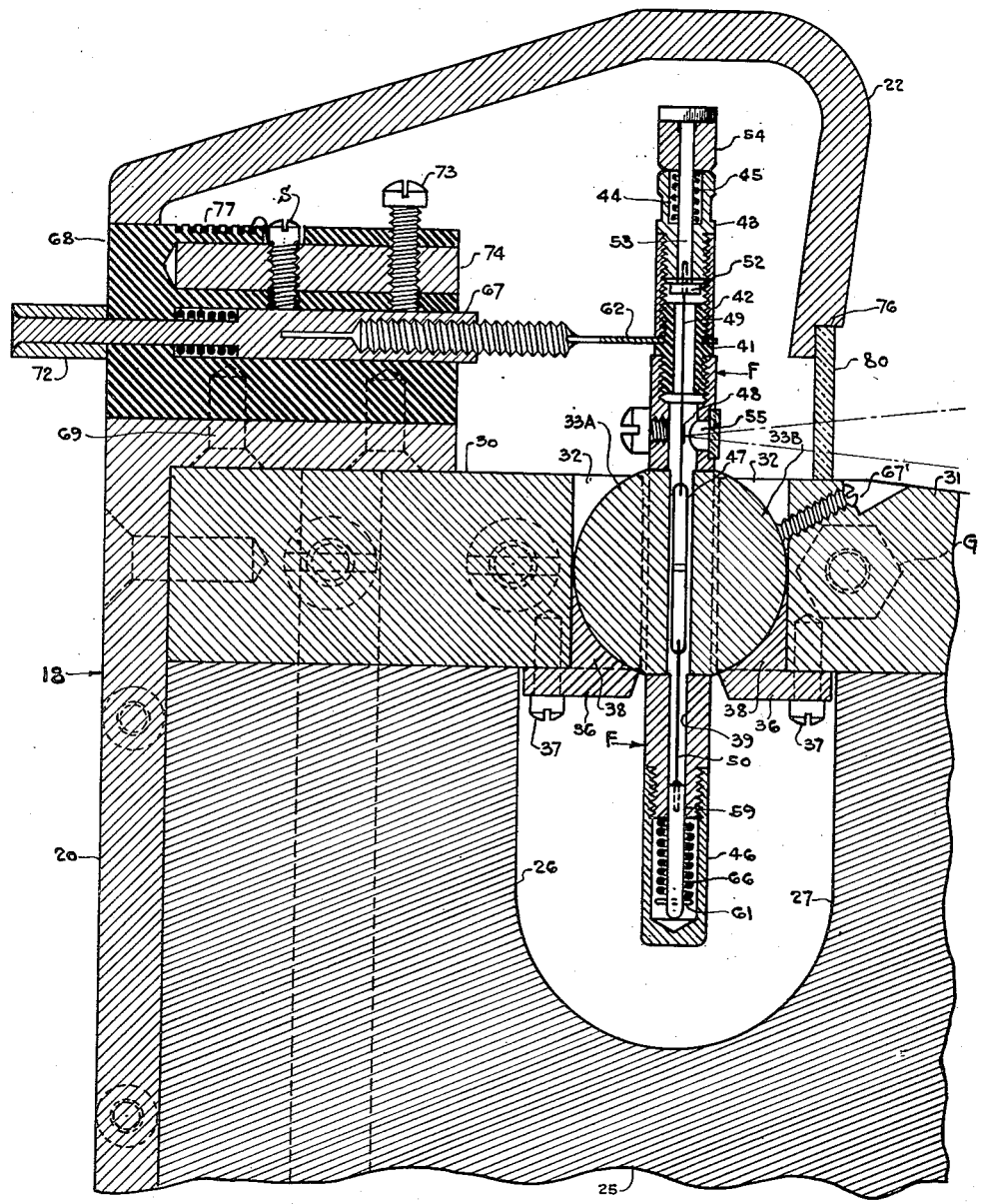
Fig. 4 is a vertical sectional view of the instrument taken along the line 4—4 of Fig. 3.

As shown in Figs. 2, 3A and 4, the inner edges of the pole pieces 30 and 31 are provided with vertical slots 32 so arranged that the slots in one pole piece are directly opposite those in the other pole piece. Slots 32 form recesses into which fit members 33A and 33B of the vibrating element housings 34. The vibrating elements 35, Fig. 5, are suspended within housing 34.

The members 33A and 33B of each vibrating element housing 34, as shown in Fig. 6, are hemicylindrical in shape. They are formed of said "Armco" or other soft iron with good magnetic properties, that is with high magnetic permeability characteristics. They are assembled within an open rectangular frame F of non-magnetic material such as brass and suitably secured in position as by soldering or brazing. The inner faces of each of members 33A and 33B are flat as shown in Figs. 3A, 4 and 7 and provide a narrow air gap between them. This gap is approximately equal to the diameter of a hole 39 which extends through the cylindrical sections of the frame F. The upper cylindrical section is interiorly threaded to receive one end of a threaded nipple 41 made of insulating material such as that sold on the market under the trade name of "Bakelite." The upper end of the nipple 41 is threaded to engage interiorly provided threads in the bottom end of sleeve 42. Sleeve 42 is formed of a good conducting metal such as brass. The top end of sleeve 42 is interiorly threaded to receive a plug 43. Plug 43 is also formed of a good conducting material such as brass. The upper end of plug 43 is provided with an enlarged recess 44 the inner shoulder of which serves to support a spring 45 shown in Fig. 4.

The bottom portion of the vibrating element housing 34 is formed of two cylindrical sections. The bottom end of the cylindrical section of frame F is exteriorly threaded to engage threads in the interior of a cylindrical section 46. Section 46 is closed at its bottom end and forms a protective covering or cap for the bottom elements of the suspension means for the vibrating element 35. The vibrating element housing 34 in assembled form is shown in cross section in Fig. 4 of the drawings, and in this view the vibrating element and its suspension elements are shown in assembled operative position. The vibrating element with its suspension means is also shown in detail in Fig. 5.

In one form of the invention the vibrating element per se comprises a coil 47, a parabolic mirror 48, and the suspension ribbons 49 and 50. The upper end of suspension ribbon 49 is soldered in an axial bore 51 formed in the head end 52 of a pin 53. The upper end of pin 53 as shown in Fig. 4, is secured, for example by soldering, to an operating knob 54. The operating knob 54 of brass is knurled on its cylindrical surface to provide a finger grip for rotating the pin 53 to adjust the position of the parabolic mirror 48 relative to an aperture 55 formed in the frame F of the vibrating element housing 34. Aperture 55 is provided in the upper cylindrical section of frame F so that light from a source 56, shown in Fig. 1, can pass through the opening 55 in the vibrating element housing, strike the parabolic mirror 48 and be reflected back to the moving photographic film or sensitized paper 57 of the recorder 13.

The bottom end of suspension ribbon 50, Fig. 5, is soldered within an axial bore 58 of a headless pin 59. Pin 59 is of substantially the same diameter as pin 53. The bottom end of pin 59 is provided with a transverse diametrical opening 60 adapted to receive a locking pin 61.

The vibrating elements 35 and their respective housings 34 in construction are assembled as complete units which are interchangeable and have like characteristics.

In construction, the insulating nipple 41 is threaded into the upper cylindrical section of that part of the vibrating element housing 34 which comprises the frame F which has already secured in place the iron members 33A and 33B. A connecting element 62, having an eyelet 63, is then threaded over the upper end of the nipple 41, and brought to rest against the top surface of the annular rim on the nipple 41. This relationship is illustrated in Figs. 2, 3, and 4. The brass sleeve 42 is then screwed on the upper end of the nipple 41 until the bottom edge of the sleeve contacts the face of the eyelet 63 of connecting element 62. The housing thus formed is ready to receive the vibrating element along with its suspension means.

A second sub-assembly is now made. The pin 53 is introduced through the longitudinal bore of the plug 43 with the head-end resting against the lower end thereof. The spring 45, Fig. 4, is then inserted in the enlarged bore or recess in the upper end of the plug 43. The knurled operating knob 54 is then put in place and pushed downwardly against the bias of spring 45. While held in this position, the position shown in Fig. 4, the upper end of pin 53 is secured to the operating knob 54, as by soldering.

In assembling a vibrating element, the ends of coil 47 are respectively connected to the upper and lower suspension ribbons 49 and 50. After pin 53 and its associated elements have been assembled, the top end of ribbon 49 is then soldered in the axial bore 51, Fig. 5, in the pin 53, after which the bottom end of ribbon 50 is soldered in the axial bore 58 of pin 59. Then the mirror 48 is cemented into position on the ribbon 49 adjacent the upper end of the coil 47. The assembled unit is then threaded through the aligned axial opening in the assembled housing unit and the plug 43 is screwed into the upper end of the top section of the assembled housing unit while knob 54 is held stationary.

The bottom end of pin 59 extending through and below the bottom section of the housing unit, has threaded over it a spring 66 which bears at its upper end against the bottom end of the lower cylindrical section of the frame F. The spring 66 is then compressed and the pin 61 placed or pressed in the opening 60 formed in the bottom end of the pin 59. The pressure of the spring 66 against the pin 61 will maintain the proper tension on the suspension ribbons and coil. After the pin 61 has been placed into position, pin 59 can then be rotated along with pin 53 to adjust the initial position of mirror 48 relative to the aperture 55 in the 34. The protective cap 46 is then slipped over the bottom end of pin 59 and spring 66 and threadedly engages the bottom end of the housing completely to seal the bottom end of the suspension means.

The mechanism described above is a completely formed unit which can be used interchangeably with other similar units in the galvanometer. The unit this formed is sufficiently compact that sixteen of them can be disposed in operative relationship in the slots formed in the pole pieces within a space of four inches.

The outer faces of hemicylindrical members 33A and 33B coincide with the surface, or form a part of a cylinder whose diameter is equal to the distance across the recesses 32 provided in pole pieces 30 and 31. They are designed not only to contact the inner surfaces of the recesses but their width is equal to that of the slots, as best shown in Fig. 3A. The spacing there shown is for clarity in the drawings; actually, the elements snugly fit within the oppositely disposed U-shaped recesses formed between or providing arms 32A. During assembly, each completed housing is lowered between a pair of opposing recesses 32. Actually, as the iron members 33A and 33B approach the slots the strong magnetic field from the magnet 25 exerts a strong force thereon and each assembly is literally snapped into place.

Because of the snug fit of members 33A and 33B within the slots, there is little if any leakage of flux. The concentration of the magnetic flux or the intensity of the magnetic field across the narrow air gap between the mounting members 33A and 33B is exceedingly high, of the order of 9,000 gausses.

Preferably, additionally to reduce the reluctance by further reducing the air gap between members 33A and 33B and the pole pieces 30 and 31, and to provide a cylindrical bearing surface for the housing and members 33A and 33B, inserts 38 are provided. As shown in Figs. 2 and 4, each insert has its inner face of cylindrical shape and the sides and back thereof are flat and closely fit against the flat sides of the slots or recesses 32. In effect, the inserts form extensions of the pole pieces 30 and 31 besides forming concave bearing surfaces for the hemicylindrical members 33A and 33B. Though bearing surfaces may be made integral with the pole pieces, they are shown as extensions from strips or bars 36 of high permeability metal such as said "Armco." Each strip or bar 36 is secured to the bottom surfaces of the pole pieces 30 and 31 by means of screws 37 and of course extends the entire width of the pole pieces. It is again emphasized the inserts 38 on three sides are in engagement with the walls of the U-shaped slots 32 while the fourth side is cylindrically concave to provide an elongated arcuate surface which rotatably supports each of the associated members 33A and 33B.

By reason of the foregoing construction, when the assembled galvanometer units, enclosed in their individual housings, are lowered into place between the U-shaped slots 32, they come to rest, or are brought there by magnetic attraction, in positions as shown in Figs. 2 and 4. Each galvanometer unit may now be rotated about an axis lying in the air gap between the opposed faces of members 33A and 33B and normal to the longitudinal axis of each galvanometer assembly 34. This axis of rotation is thus shown to coincide with the axis about which the arcuate surfaces of members 33A and 33B are generated and symmetrically disposed, and it is also normal or perpendicular to the flux path between pole pieces 33A and 33B.

After the assembled units are placed in the slots formed in the pole pieces 30 and 31, the threaded ends of the connecting elements 62 are engaged by the horizontally disposed interiorly threaded brass bushings 67. Bushings 67 are rotatably mounted in a "Bakelite" block 68 that is secured to an inwardly projecting portion of the side 20 of the housing 18 by means of screws 69. Each of bushings 67 is provided with a spring 70 which bears against the block 68 and the bushing. The bushings 67 are held in position in the "Bakelite" block by means of sleeves 72 solder-sweated on the portions of bushings 67 of reduced diameter which extend to the outside of wall 18 of the housing. The outer cylindrical surfaces of the sleeves 72 are knurled and serve as means whereby the bushings 67 can be rotated to adjust the threaded engagement between the bushings 67 and the connecting elements 62. It will be observed that rotation of the bushings 67 will effect an adjustment of the longitudinal axes of the vibrating element housings. That is, each assembly 34 may be rotated about an axis of rotation which coincides with the axis of generation of hemicylindrical members 33A and 33B. If the sleeve 72 be rotated in one direction or the other the galvanometer unit 34 will be tilted about said axis in a clockwise or a counter-clockwise direction. This will change the position of the mirror 48 with respect to its light source 56, Fig. 1, and will therefore serve for adjustment of the vertical position of the reflected beam of light received by the recording film or paper 57. For horizontal adjustment, the knob 54 at the top of each assembly is rotated in the desired direction to produce a corresponding movement or rotation of the suspension ribbon 49 and mirror 48 about the longitudinal axis of the housing 34. Preferably the protective cap 46 is removed for simultaneous rotation of pin 59 in direction and amount corresponding with rotation of knob 54.

After the vibrating element housings and their enclosed vibrating elements have been adjusted by rotating the bushings 67, which threadedly engage the connecting elements 62, screws 67' extending through pole pieces 31, are brought into engagement with the arcuate surfaces of the members 33B of the vibrating element housings to lock the housings in their adjusted positions. When the longitudinal axes of the vibrating elements and housings have been adjusted, screws 73 are tightened to hold bushings 67 in adjusted position and to prevent subsequent turning thereof until after locking screws 67' have been loosened.

In addition to serving as means whereby the longitudinal axes of the vibrating element housings can be adjusted, connecting elements 62 and bushings 67 with screws 73 and the brass bushings 74, pressed into the "Bakelite" block, form the conducting paths whereby current from conductors 76 can be conducted to the coils 47 of the vibrating elements. Conductors 76, as shown in Fig. 3, are supplied with current by the conductors 17 from the individual amplifiers 15. Separate conducting paths for the current from the amplifiers 15 are respectively through the conductors 17, conductors 76, wire clamping screws S, brass bushings 74, screws 73, brass bushings 67, connecting elements 62, sleeves 42, plugs 43, shoulder 52, pins 53, suspension ribbons 49, coils 47, suspension ribbons 50, pins 59, pins 61, springs 66, the lower sections of the housings to a ground terminal G, Fig. 4, common to the galvanometer and the output of the amplifiers.

Current flowing through each of the conducting circuits thus described results in the production of a magnetic field by each of the coils 47, which is generally normal to the stationary field. The field of each coil 47 reacts with the powerful magnetic field of constant intensity supplied by the pole pieces 30 and 31 and the magnet 25 to produce torsional movement of the coils 47 carrying the current and of the parabolic mirrors 48 cemented to the upper suspension ribbons adjacent the upper ends of the coils. The torsional movement of each mirror results in the tracing of records on a moving sensitized paper or photographic film 57. Each record varies in amplitude in accordance with the variations of current flowing through the coils 47. The upper face of the "Bakelite" block 68 is milled out as shown at 77 to provide recesses in which the conductors 76 can be permanently embedded or secured.

In order to protect the tops of the vibrating element housings when the elements are assembled in operative position, there is provided an aluminum cover plate 22 which forms a part of the top for the entire instrument. The cover plate 22 has at its front a downwardly extending portion that is adapted to engage at 78 a transparent support 80. Support 80 is formed of transparent material so that light from the source 56 can pass through it and the apertures 55 in the vibrating element housings and be reflected from the parabolic mirrors carried by the vibrating elements back through the transparent support 80 to the moving sensitized paper or photographic film 57.

Provided on the front wall 21 of the housing 18, Fig. 2 are projections 81 and 82 adapted to carry reflecting mirror assemblies 83 and 84 respectively. As shown in Fig. 1, light from a source 85 in passing to a mirror 86 carried by the assembly 83 is intercepted at controlled intervals by the timing device 12 comprising an electrically driven vibrating reed 87 which has attached to its free end a shutter 88 having an opening in the form of a horizontal slit therein through which the light is allowed to pass at regular intervals while the reed 87 is being driven. The light passing through the aperture in the shutter 88 is reflected from the mirror 86 to mirror 89 from which it is reflected at substantially right angles to the moving photographic film or sensitized paper 57 where it will form, by exposure, transverse lines thereon at predetermined intervals. These transverse lines are used to reckon the passage of time during the recording of seismic waves.

Each of the coils 47 is preferably wound on an exceedingly light aluminum frame of narrow rectangular shape. It may be in the form of a thin strip and forms a single short-circuited turn, with the turns of the coil 47 wound around the exterior thereof.

As the invention has been carried into practice there is produced in the air gap within which the coils 47 are suspended magnetic fields or flux densities upwardly of 7,500 gausses or more, the more usual field strength obtained being of the order of 9,000 gausses and above. In consequence, the galvanometer coils 47 are self-damping. Upon motion of the coils and of their aluminum frames, currents are induced in the aluminum frames which oppose their motion.

Because the coils 47 are provided with many turns of fine wire they are driven or rotated to positions corresponding with the instantaneous strength of the applied signal current. As soon however as the applied current disappears the coil tends to return to its original position, the suspension ribbons 49 and 50 providing a return bias therefor. Because the galvanometers are exceedingly sensitive instruments, responding to currents almost at the vanishing point (less than one billionth of an ampere), the return bias is of a very low order. Hence after a relatively strong signal disappears the coils and mirrors may tend to oscillate. But by the induced currents in the aluminum frames, they quickly come to a standstill by the magnetic damping effect provided.

The strength of the magnetic fields around the coils is so much greater than previously attained magnetic damping has been found to be quite adequate. This may be readily understood by the fact that the amount of current induced in the aluminum frame increases as the square of the increase in the flux density; that is by doubling the density, four times the damping effect is obtained.

When damping oil is desired, suitable structures embodying the present invention may be readily provided.

In Fig. 8 there is shown a modification of the invention described above. In this form of the invention, the parabolic mirror 48 of Fig. 5, has been replaced by a plane aluminized mirror 95 as shown in Fig. 8. Mirror 95 is in like manner attached to the upper coil suspension ribbon 49. In order critically to damp the coil 47 against lateral movement as well as rotational movement, the housing 34 is filled to a point above the mirror 95 with a transparent damping fluid 96, such as castor oil. The opening 55 in the housing 34 is sealed by a focusing lens 97. In order to provide for the expansion and contraction of the damping fluid 96 within the housing 34, there is provided at a point above the surface of the fluid, a vent 98 which forms a communicating passage between the chamber within the housing 34 and the atmosphere.

As illustrated in Fig. 9, when using a plane mirror on the suspension ribbon 49 and a lens 97 to seal the opening 55, it is necessary to use a cylindrical lens 99 immediately in front of the moving sensitized paper or photographic film 57. In this form of the invention the transparent support 80, as shown in Figs. 2 and 4, can be eliminated, or the housing F may be sealed by a glass insert G in place of the lens 97.

Although the invention as disclosed in Figs. 1 through 7 provides for magnetically damping the vibrating coil 49 against rotation about the longitudinal axis, the latter form of the invention disclosed in Figs. 8 and 9 has the further advantage of providing additional damping against lateral displacements of the coil, which might be of sufficient magnitude where a rapid build-up of current occurs to cause the coil to be deflected an amount which could cause it to bump or scrape against the wall of the housing. An additional feature of this latter form of the invention resides in the provision of independent bodies of fluid for separately damping each of the elements of the galvanometer. In this manner all chances of mechanically cross-feeding through the oil from one coil to another are eliminated.

While the slots 32 have been illustrated, Fig. 3A, as milled in the faces of pole pieces 30 and 31 it is to be understood the extensions or arms 32A may be made separately and secured thereto or replaced by suitable spacing members. Similarly the inserts 38 may be made integral with the pole pieces 30 and 31. With constructions of the type already described additional inserts corresponding in shape with the inserts 38 may be utilized to fill in the upper part of the air gaps Fig. 4 shown to the left and right respectively, of members 33A and 33B. They may be held in place magnetically. Even without such inserts the aforesaid high field intensities are obtained in the air gap in which the coils 47 are situated.

A further modification within the scope of the present invention suggests itself. The rectangular slots may be replaced by concave recesses to receive magnetic inserts in the form of sections of a torus or of a doughnut-shaped member. Such inserts form the inner pole pieces, and are torus shaped or of double curvature on the exterior thereof. In all forms of the invention, the rotation of each housing 34 is accomplished without introducing an additional or an increased length of air gap or changing the existing magnetic reluctance between the north and south poles of the permanent magnet 25. This new result is accomplished even though the aforesaid relative movement occurs within the flux path between the pole pieces of magnet 25. The axis of rotation in each case coincides with the axis of generation of the cooperating arcuate surfaces which form the bearing means for pivotal movement or rotation of the housing of each galvanometer unit. By providing the complementary arcuate surfaces, a substantial area of contact therebetween minimizes the reluctance to a point where it is negligible in effect on the magnetic flux. Moreover, the housings and their elements may be adjusted to any pivotal position, without changing the reluctance.

Though dimensions need not be given the relative size of the parts is indicated by again stating four slots and four galvanometer units are assembled within a width of one inch of the pole pieces 30 and 31. The invention not only lends itself to compact design but in case a galvanometer unit fails or is to be replaced, it is only necessary to remove cover 22 and loosen locking screws 67' and 73. The knurled handle or knob 72 is then rotated to tilt the particular unit in a clockwise direction until the connecting element 62 disengages itself from sleeve 67. The unit 34 may then be bodily lifted from the slots 32 and a new element inserted in its place.

The plane of each coil 47 in the absence of current flow is parallel with the flow of magnetic flux across it. Therefore the magnetic field produced by the flow of current through the turns of the coil 47 is initially at right angles thereto, a relationship which produces maximum sensitivity.

The reflecting face or plane of each mirror 48 is at right angles to the plane of the coil 47, and in the absence of current flow is normal to the direction of the flux across the air gap. As already shown, each feature including that last-described, contributes to compactness, low cost, and ruggedness, without sacrifice of sensitivity but with substantial gain thereof.

While embodiments of the invention have been described, it will be understood that further modifications may be made without departing from the true spirit and scope of the invention as set forth in the appended claims.

What is claimed is:

1. In a galvanometer, a non-magnetic casing having opposed portions of magnetic material forming a pair of inner pole pieces with a relatively narrow air gap therebetween, the exterior configuration of each of said inner pole pieces being arcuate, a magnet associated with said inner pole pieces, said magnet having pole pieces at least a part of which are arcuate in shape and complementary to said configuration of said inner pole pieces to form a substantially closed magnetic circuit and which together form pivoting means for said inner pole pieces and the casing of which they are a part.

2. In a galvanometer, a magnet having opposed pole pieces which approach each other with an air gap for the passage of magnetic flux therebetween, at least a part of the opposed pole faces being curved about a stationary axis of curvature located intermediate said pole faces, a support for suspending a galvanometer element between said pole faces, said support having magnetic members whose exterior configuration are complementary to said curved surfaces of said pole faces to form a substantially closed magnetic circuit, and which cooperate therewith to provide for pivotal movement of said support without change in said air gap.

3. In a multiple galvanometer comprising in combination, a plurality of independent galvanometer units, means for independently, pivotally, and detachably mounting said units in operative positions, said mounting means comprising a magnet having opposed pole faces, portions of which are cylindrically concave in shape, a casing for each galvanometer unit having pole pieces forming a narrow air gap between the inner surfaces thereof and the outer surfaces thereof being cylindrically convex in shape and adapted respectively to engage said cylindrically concave portions of said opposed pole faces to eliminate any substantial air gap therebetween, and to be magnetically held thereagainst and relatively rotatable with respect thereto.

4. In a galvanometer, a unitary support for the movable element thereof, said support having spaced wall portions formed from magnetic material and forming a pair of inner pole pieces with a relatively narrow air gap therebetween, a galvanometer coil, means suspending said coil in in said air gap, a magnet having outer pole pieces disposed over said inner pole pieces, said outer and inner pole pieces having complementary shapes of a character to provide a substantially closed magnetic circuit and to provide pivotal movement of said support without changing the reluctance of the path between said outer pole pieces and across the air gap in which said coil is suspended.

5. In a galvanometer, a magnet having outer pole pieces which approach each other, said pole pieces having opposed slots closed and of cylindrically concave shape along corresponding sides of said pole pieces and open at the opposite sides thereof, a galvanometer unit having rigid inner pole pieces the extensions thereof being of cylindrically convex shape and of a size closely to fit oppositely disposed slots of said pole pieces, the magnetic flux of said magnet passing directly from said outer pole pieces through said inner pole pieces and magnetically holding said cylindrically shaped surfaces in engagement with each other.

6. In a multiple-element galvanometer, a magnet having elongated pole pieces forming an air gap therebetween, housings for individual galvanometer elements, each housing having magnetic members rigidly carried thereby, a substantial outer portion of each being cylindrical in shape, the diameter across said cylindrical portions being equal to the maximum spacing between said pole pieces, and magnetic conductors cooperating with each of said pole pieces and said cylindrical portions for supporting said housings and providing for pivotal movement thereof.

7. In a multiple-element galvanometer having a plurality of independent vibrating elements and individual housings comprising in combination, a single permanent magnet of substantially U-shape, pole pieces for said permanent magnet, said pole pieces having formed in adjacent faces thereof slots adapted to receive and support the vibrating element housings in contact therewith, common means for adjusting the upright disposition of each of the vibrating element housings and their vibrating elements to effect an adjustment of the focal direction of the mirrors carried by the vibrating elements and for conducting current to said vibrating elements from an external source.

8. A multiple-element galvanometer comprising in combination a permanent magnet, pole pieces for said permanent magnet, said pole pieces having slots formed in adjacent faces thereof, vibrating elements, a mirror carried by each of said vibrating elements, individual housings for said vibrating elements, adapted to be inserted into and supported in the slots formed in the adjacent faces of the pole pieces, and common means for adjusting the position of the longitudinal axis of the respective vibrating element housings to effect an adjustment of the focal direction of the mirrors carried by the individual vibrating elements and for conducting current to said vibrating elements from an external source.

9. In a galvanometer, having a vibrating element, the combination of a housing for said vibrating element, a magnet having pole pieces, means pivotally mounting said housing between said pole pieces, and common means for adjusting the angular position of said housing and for conducting current to said vibrating element from an external source.

10. In a galvanometer having a vibrating element, including a coil, the combination of a housing for said element, said housing including electrically conductive metallic sections secured together by an intermediate section of insulating material, means connecting the respective ends of said coil to said metallic sections, a magnet for producing magnetic flux, means pivotally mounting said housing and coil in the path of said magnetic flux, and common means for adjusting the angular position of said housing and for conducting current to said element from an external source.

11. In a galvanometer housing a vibrating element, including a coil, the combination of a housing for said element, said housing including electrically conductive metallic sections secured together by an intermediate section of insulating material, means connecting the respective ends of said coil to said metallic sections, a magnet for producing magnetic flux, means pivotally mounting said housing and coil in the path of said magnetic flux, common means for adjusting the angular position of said housing and for conducting current to said element from an external source, and means for locking said housing in a fixed angular position.

12. In a multiple element galvanometer consisting of a magnet having oppositely disposed pole pieces, said pole pieces being adapted to receive a plurality of the galvanometer units in substantially parallel arrangement, each of said units comprising a housing, a coil, means rotatably supporting said coil in said housing, means to conduct current to said coil, a mirror disposed adjacent said coil and adapted to move therewith, the plane of said mirror being disposed substantially normal to the flux path between the pole pieces of the magnet when no current is flowing in said coil, an aperture in said housing adjacent said mirror whereby light may be directed upon and reflected from said mirror, the improvement which comprises structure magnetically connected with and suspended between the pole pieces for supporting said housing and unit so that the unit may be rotated about an axis lying between said pairs of pole pieces and extending in a direction substantially normal to said flux path therebetween and substantially perpendicular to the axis of rotation of the coil, whereby the focal direction of the mirror may be varied.

13. In a multiple element galvanometer consisting of a magnet having oppositely disposed pole pieces, said pole pieces being adapted to receive a plurality of galvanometer units in substantially parallel arrangement, each of said units comprising a housing, a coil, means rotatably supporting each coil within said housing, means to conduct electric current to said coil, a mirror disposed adjacent said coil and adapted to move therewith, said mirror being disposed with the reflecting face substantially normal to the flux path between the pole pieces of the magnet when no current is flowing in said coil, an aperture in said housing adjacent said mirror whereby light may be directed upon and reflected from said mirror, the improvement which comprises structure secured to the inner edges of the bottom faces of the pole pieces and extending into the space therebetween in manner to form a bearing for the housing, means on said housing extending to the pole faces of said pole pieces forming a path therebetween of high magnetic permeability and shaped to cooperate with said bearing structure to permit rotation of said housing and unit about an axis located between the pole faces, and extending in a direction substantially normal to the flux path therein and substantially perpendicular to the axis of rotation of the coil, said bearing structure having a shape such that the focal direction of the mirror may be varied without changing the air gap distance between said coil and each of said pole pieces.

14. In a multiple element galvanometer consisting of a permanent magnet, a plurality of pole pieces for said permanent magnet, said pole pieces having slots formed in adjacent faces of the oppositely disposed pairs of north and south poles, with a plurality of units each unit respectively disposed in one of the slots, each of said units comprising a housing, a coil, means rotatably supporting said coil within said housing, means to conduct electric current to said coil, a mirror disposed adjacent said coil and adapted to move therewith, said mirror being disposed with its reflecting face substantially normal to the flux path between the pole pieces of the magnet when no current is flowing in said coil, an aperture in said housing adjacent said mirror whereby light may be directed upon and reflected from said mirror, the improvement which comprises structure secured to the inner edges of the bottom faces of the pole pieces and extending into the slots to form a bearing for said housing, means on said housing extending to the pole faces of said pole pieces forming a path therebetween of high magnetic permeability and shaped to cooperate with said bearing structure to permit rotation of said housing and unit about an axis located within the slot, said axis extending in a direction substantially normal to the flux path therein and substantially perpendicular to the axis of rotation of the coil whereby the focal direction of the mirror may be varied without changing the air gap distance between said coil and each of said pole pieces.

15. In a multiple element recording galvanometer consisting of a permanent magnet, a plurality of pole pieces for said permanent magnet, said pole pieces having slots formed in adjacent faces of the oppositely disposed pair of north and south poles, with a plurality of units each unit respectively disposed in one of the slots, each of said units comprising a housing, a coil, means rotatably supporting said coil in said housing, means to conduct electric current to said coil, a mirror disposed adjacent said coil and adapted to move therewith, said mirror being disposed with its reflecting face substantially normal to the flux path between the pole pieces of the magnet when no current is flowing in said coil, an aperture in said housing adjacent said mirror whereby light may be directed upon and reflected from said mirror, the improvement which comprises forming said housings with an enlarged portion in the shape of a section of a cylinder with the coil disposed within the enlarged portion of said housing, the enlarged portions of said housing being formed of material of high magnetic permeability and forming a part of said flux path between said pole pieces thereby to provide a strong magnetic field for said coil, means secured to the inner edges of the pole pieces and extending into the slots to form a bearing for the cylindrical section of said housing whereon said unit may be rotated about the principal axis of said cylindrical section to vary the focal direction of the mirror.

16. In a multiple-element galvanometer consisting of a permanent magnet, a plurality of pole pieces for said permanent magnet, said pole pieces having slots formed in adjacent faces of the oppositively disposed pairs of north and south poles, with a plurality of units adapted to be disposed in the slots formed in the pole pieces, each of said units comprising an elongated housing having a substantially uniform internal cross section, a coil, means for rotatably supporting said coil in said housing, means to conduct electric current to said coil, a mirror disposed adjacent said coil and adapted to move therewith, said mirror having its reflecting face disposed substantially perpendicular to the plane of said coil, an aperture in said housing adjacent said mirror whereby light may be directed upon and reflected from said mirror, means to permit axial rotational adjustment of the position of said mirror and coil within said elongated housing, said housing comprising enlarged portions cooperating with said pole pieces to form a path therebetween of high magnetic permeability, means supporting said unit in one of said slots between said pole pieces with the enlarged portions of the housing in contact with said pole pieces, said supporting means and enlarged portions cooperating to permit rotation of said housing and unit about an axis within the slot, which axis is perpendicular to the path of the flux between the pole pieces and perpendicular to the axis of rotation of the coil.

17. In a multiple galvanometer comprising the combination of a magnet having a pair of oppositely disposed, soft magnetic iron pole pieces, a galvanometer unit disposed between said pole pieces and magnetically connected therewith comprising an elongated housing, a coil rotatably suspended within said housing, means to conduct electric current to said coil, the coil being suspended so that its plane is normally parallel to the flux path, a mirror disposed adjacent said coil and adapted to move therewith, said mirror disposed with its reflecting face substantially perpendicular to the plane of said coil, and means for supporting said housing and unit between said pole pieces so that the unit may be rotated about an axis lying between said pair of pole pieces, substantially normal to said flux path and substantially perpendicular to the axis of rotation of the coil whereby the focal direction of the mirror may be varied.

18. In a multiple element galvanometer, the combination of a magnet having a pair of soft magnetic iron pole pieces, said pole pieces having opposing slots therein, a unit disposed in said slots comprising an elongated housing, a coil rotatably suspended within said housing by light metallic ribbons respectively attached to the opposite ends of the coil and to the respective ends of the housing adjacent thereto, said metallic ribbons serving as means to conduct electric current to said coil, the coil being suspended so that its plane is normally substantially parallel to the flux path, a mirror disposed adjacent said coil and adapted to move therewith, said mirror being disposed substantially perpendicular to the plane of said coil, and means for supporting said housing and unit in said slots so that the unit may be rotated about an axis lying between said pair of pole pieces, substantially normal to said flux path and substantially perpendicular to the axis of rotation of the suspended coil whereby the focal direction of the mirror may be varied.

19. In a multiple element galvanometer comprising the combination of a permanent magnet having a pair of soft magnetic iron pole pieces, said pole pieces having a slot therebetween, a unit disposed in said slot comprising an elongated housing having a substantially uniform internal cross section, a coil rotatably suspended in said housing, means to conduct electric current to said coil, a mirror disposed adjacent said coil and adapted to move therewith, said mirror being disposed substantially perpendicular to the plane of said coil, an aperture in said housing adjacent said mirror whereby light may be directed upon and reflected from said mirror, means to permit adjustment of the position of said mirror and coil relative to the ends of said elongated housing, said housing comprising enlarged portions cooperating with said pole pieces to form a path therebetween of high magnetic permeability, means to support said unit in the slot between the pole pieces with the enlarged portions of the housing in contact with the pole pieces, said supporting means and enlarged portions cooperating to permit rotation of said housing and unit about an axis within the slot, perpendicular to the path of the flux between the pole pieces and perpendicular to the axis of rotation of the coil.

20. In a multiple element galvanometer comprising the combination of a permanent magnet having a pair of soft magnetic iron pole pieces, said pole pieces having a slot therebetween, a unit disposed in said slot comprising an elongated housing, a coil rotatably suspended within said housing, means to conduct electric current to said coil, the coil being suspended so that its plane is normally parallel to the flux path, a mirror disposed adjacent said coil and adapted to move therewith, said mirror being disposed substantially perpendicular to the plane of the coil, an aperture in said housing adjacent said mirror whereby light be directed upon and reflected from said mirror through said housing, transparent means sealing said aperture, a damping liquid within said housing surrounding said coil, and means for supporting said housing and unit in the slots so that the unit may be rotated about an axis lying between said pole pieces, substantially normal to said flux path and substantially perpendicular to the axis of rotation of the coil whereby the focal direction of the mirror may be varied.

21. In a galvanometer, a non-magnetic frame, spaced wall portions of said frame being formed of magnetic material and forming a pair of inner pole pieces with a relatively narrow air gap therebetween, and a magnet, end portions of which are magnetically connected to said inner pole pieces, said inner pole pieces and said end portions having complementary shapes each of which forms a part of a surface of revolution generated about an axis lying within said air gap, said surfaces providing for pivotal movement of said frame about said axis.

22. In a galvanometer, a non-magnetic frame, spaced wall portions of said frame being formed of magnetic material and forming a pair of inner pole pieces with a relatively narrow air gap therebetween, means for suspending the movable element of said galvanometer within said air gap, means for producing across said air gap a strong magnetic field, said means including outer pole pieces, said inner and outer pole pieces having complementary shapes each of which forms a part of a surface of revolution generated about an axis lying within said air gap, said complementary shapes being so related as to support said frame for pivotal movement about said axis.

23. In a multiple element galvanometer, means including a magnet for producing a strong magnetic field across an air gap, said means including elongated pole pieces with at least a part of the opposed surfaces thereof corresponding with a surface of revolution generated about an axis lying within said air gap, each element of the galvanometer including a non-magnetic frame with spaced wall portions formed of magnetic material and providing a relatively narrow air gap between the inner faces thereof, said wall portions extending outwardly from said frame and each outwardly extending portion having the shape of a surface of revolution generated about said axis lying within said air gap and complementary with said first-mentioned surfaces of revolution, said complementary surfaces providing an elongated area of contact to provide a low reluctance flux path to said narrow air gap and providing support for the non-magnetic frame of each of said elements for independent pivotal movement about said axis.

24. An oscillograph galvanometer assembly comprising a common magnet field structure provided with pole pieces each having a concave surface, a plurality of galvanometer element support members, a pair of pole tips mounted in spaced relation on each galvanometer support member, each pole tip having a convex surface complementary to a face of one of said pole pieces, said pole tips being mounted between the pole faces of said magnetic structure to pivotally support said galvanometer support member relative to said magnetic structure.

25. An oscillograph galvanometer comprising a magnetic field structure provided with concave pole faces each corresponding to a section of a cylindrical surface, a galvanometer element, a support therefor, a pair of pole tips mounted on said support in spaced relation to said galvanometer element, each pole tip having a convex surface complementary to a pole piece face, said pole tips being mounted between said magnetic structure pole faces in contact therewith to serve as bearing and support members for said galvanometer support and element, and means for pivotally adjusting the position of said galvanometer support relative to said magnetic field structure.

LURY B. REDMOND.